US008772966B1

(12) United States Patent
Agrawal et al.

(10) Patent No.: US 8,772,966 B1
(45) Date of Patent: Jul. 8, 2014

(54) SYSTEM AND METHOD FOR SELECTING A POWER SUPPLY SOURCE

(75) Inventors: Abhishek Agrawal, Orissa (IN); Priyank Shukla, Chhattisgarh (IN)

(73) Assignee: Applied Micro Circuits Corporation, Sunnyvale, CA (US)

( * ) Notice: Subject to any disclaimer, the term of this patent is extended or adjusted under 35 U.S.C. 154(b) by 457 days.

(21) Appl. No.: 13/110,162

(22) Filed: May 18, 2011

(51) Int. Cl.
H02J 1/00 (2006.01)
H02J 3/00 (2006.01)

(52) U.S. Cl.
USPC ................................................. 307/80

(58) Field of Classification Search
USPC .............. 307/46, 48, 64–66, 75, 80; 327/539, 327/547
See application file for complete search history.

(56) References Cited

U.S. PATENT DOCUMENTS

| | | | | |
|---|---|---|---|---|
| 4,788,450 | A * | 11/1988 | Wagner | 307/64 |
| 5,712,590 | A * | 1/1998 | Dries et al. | 327/539 |
| 5,784,626 | A * | 7/1998 | Odaohara | 713/300 |
| 5,862,493 | A | 1/1999 | Barkat et al. | |
| 5,886,561 | A * | 3/1999 | Eitan et al. | 327/408 |
| 6,118,188 | A * | 9/2000 | Youssef | 307/43 |
| 6,167,289 | A | 12/2000 | Ball et al. | |
| 6,420,906 | B1 * | 7/2002 | Kohda | 326/114 |
| 7,109,783 | B1 * | 9/2006 | Kondapalli et al. | 327/540 |
| 7,466,573 | B2 * | 12/2008 | Kojori et al. | 363/65 |
| 7,633,334 | B1 * | 12/2009 | Li et al. | 327/539 |
| 7,657,290 | B2 | 2/2010 | Veselic et al. | |
| 8,044,639 | B2 * | 10/2011 | Tamegai et al. | 320/138 |
| 8,289,799 | B2 * | 10/2012 | Hayden | 365/226 |
| 2003/0218452 | A1 * | 11/2003 | Brox | 323/282 |
| 2006/0119742 | A1 | 6/2006 | Park | |
| 2010/0130263 | A1 | 5/2010 | Zhang et al. | |
| 2011/0112782 | A1 | 5/2011 | Majima et al. | |

OTHER PUBLICATIONS

Intersil; ISL6256/6256A Data Sheet; Highly Integrated Battery Charger with Automatic Power Source Selector for Notebook Computers; Sep. 14, 2010; FN6499.3; USA.
Maxim; MAX8671X Data Sheet; PMIC with Integrated Charger and Smart Power Selector for Handheld Devices; Aug. 2007; 19-0885, Rev 0; USA.
Texas Instruments; bq24030 Data Sheet; Single-Chip Charge and System Power-Path Management IC; Oct. 2009; SLUS618H; USA.
Texas Instruments; bq24070 Data Sheet; Single-Chip Li-Ion Charge and System Power-Path Management IC; Dec. 2009; SLUS694F; USA.
Texas Instruments; bq24725 Data Sheet; 2-4 Cell Li+ Battery SMBus Charge Controller with N-Channel Power MOSFET Selector & Advanced Circuit Protection; Nov. 2010; SLUS702A; USA.

* cited by examiner

Primary Examiner — Rexford Barnie
Assistant Examiner — Rasem Mourad
(74) Attorney, Agent, or Firm — Amin, Turocy & Watson, LLP

(57) ABSTRACT

A power supply source selection circuit is provided with a comparator and a switch. The comparator has an input to accept a first reference voltage directly proportional to a bandgap reference voltage. For example, the bandgap voltage may be derived from a battery voltage. The comparator has an input to accept a second reference voltage directly proportional to a first supply voltage (e.g., a line voltage), and an output to supply a switch signal in response to comparing the second reference voltage to the first reference voltage. The switch has an input to accept the first supply voltage, an input to accept a second supply voltage, and input to accept the switch signal. The switch has an output to supply a third supply voltage to a regulator. The third voltage has a voltage potential less than or equal to a maximum voltage value. The switch selects between the first supply voltage and the second supply voltage in response to the switch signal.

20 Claims, 8 Drawing Sheets

SYSTEM AND METHOD FOR SELECTING A POWER SUPPLY SOURCE

BACKGROUND OF THE INVENTION

1. Field of the Invention

This invention generally relates to integrated electronic circuitry and, more particularly, to a circuit for the selection of power supply sources.

2. Description of the Related Art

Portable devices typically use an internal battery to supply power. The most important figure of merit of a battery in today's power hungry device landscape is the battery lifetime (for a non-re-chargeable battery) or the time between two chargings (for a re-chargeable battery). This time is inversely proportional to the amount of power drawn from it. So, in order to increase battery lifetime, the use of external supply to source power, whenever available, is desired.

It would be advantageous if the functions of power supply source switching could be simplified enough to be implemented as a feature of a monolithic device circuit.

SUMMARY OF THE INVENTION

Accordingly, a power supply source selection circuit is provided with a comparator and a switch. The comparator has an input to accept a first reference voltage directly proportional to a bandgap reference voltage. For example, the bandgap voltage may be derived from a battery voltage. The comparator has an input to accept a second reference voltage directly proportional to a first supply voltage (e.g., a line voltage), and an output to supply a switch signal in response to comparing the second reference voltage to the first reference voltage. The switch has an input to accept the first supply voltage, an input to accept a second supply voltage, and input to accept the switch signal. The switch has an output to supply a third supply voltage to a regulator. The third voltage has a voltage potential less than or equal to a maximum voltage value. The switch selects between the first supply voltage and the second supply voltage in response to the switch signal.

The comparator supplies a "high" switch signal about equal to the second supply voltage when the first reference voltage is less than the second reference voltage, and supplies a "low" switch signal about equal to (second supply voltage/2) when the second reference voltage is greater than the first reference voltage. The switch selects the first supply voltage when the switch signal is "high", and selects the second supply voltage when the switch signal is "low".

Additional details of the above-described power supply source selection circuit are provided below.

DETAILED DESCRIPTION

Figure 1:
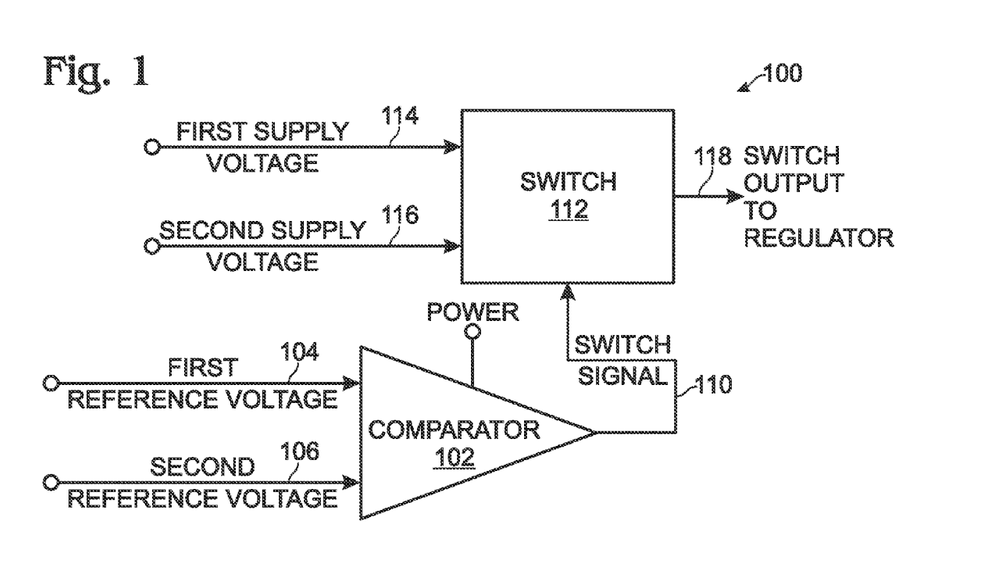
FIG. 1 is a schematic block diagram of a power supply source selection circuit.

FIG. 1 is a schematic block diagram of a power supply source selection circuit. The power supply source selection circuit 100 comprises a comparator 102 having an input on line 104 to accept a first reference voltage directly proportional to a bandgap reference voltage, and input on line 106 to accept a second reference voltage directly proportional to a first supply voltage. The comparator has a power supply input, and an output on line 110 to supply a switch signal in response to comparing the second reference voltage to the first reference voltage. A switch 112 has an input on line 114 to accept the first supply voltage, an input on line 116 to accept a second supply voltage, and input on line 110 to accept the switch signal. The switch output on line 118 supplies a third supply voltage to a regulator. The third voltage has a voltage potential less than or equal to a maximum voltage value. The switch selects between the first supply voltage and the second supply voltage in response to the switch signal.

Figure 2:
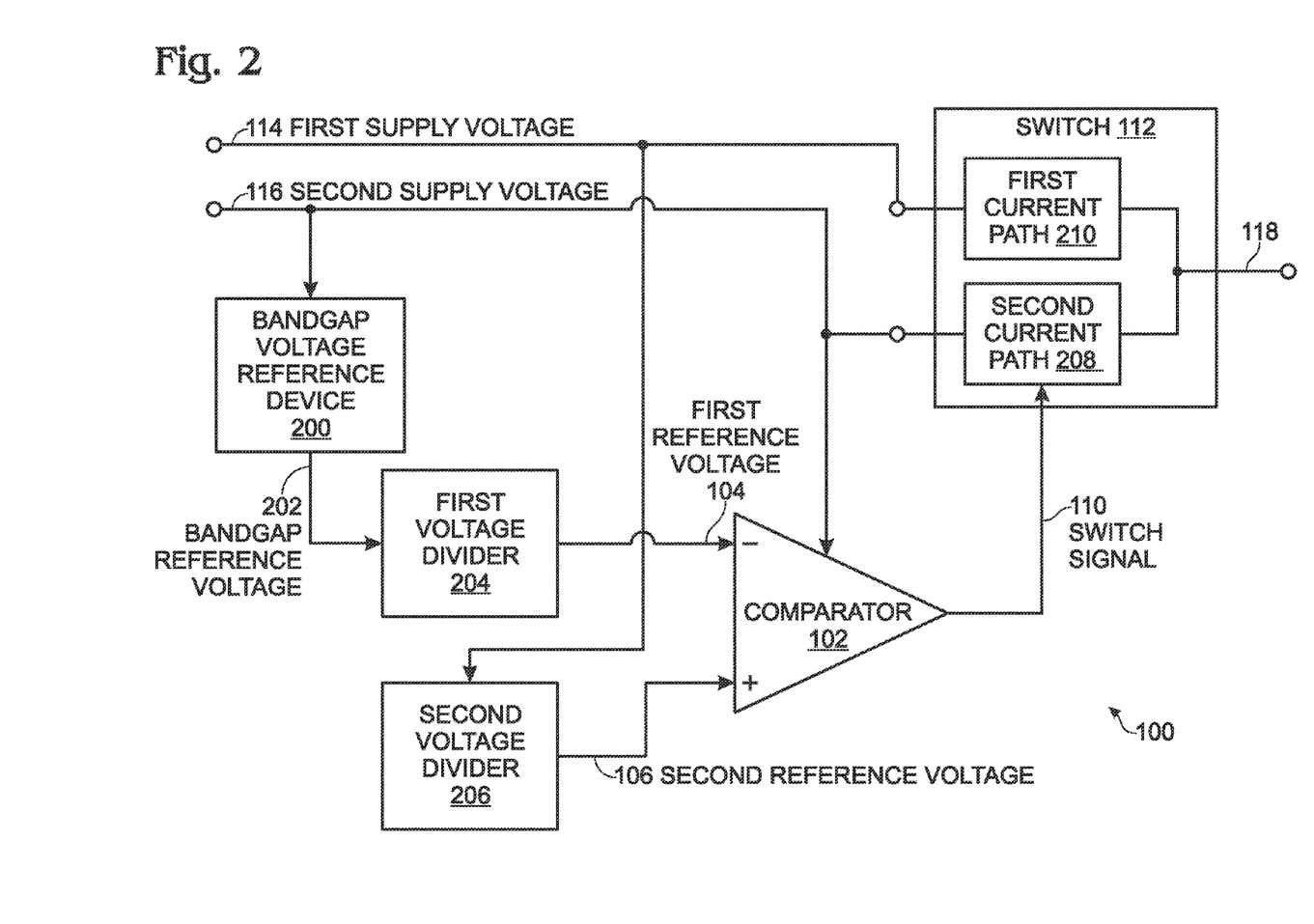
FIG. 2 is a schematic block diagram depicting the power supply source selection circuit of FIG. 1 with additional features.

FIG. 2 is a schematic block diagram depicting the power supply source selection circuit of FIG. 1 with additional features. In this aspect a bandgap voltage reference circuit 200 has an input on line 116 to accept the second supply voltage and an output on line 202 to supply the bandgap reference voltage, which has a constant voltage potential. As is widely known in the art, a bandgap voltage reference circuit is a temperature independent voltage reference circuit widely used in integrated circuits, usually with an output voltage around 1.25 V, close to the theoretical 1.22 eV bandgap of silicon at 0 K.

A first voltage divider 204 has an input on line 202 to accept the bandgap reference voltage and an output on line 104 to supply the first reference voltage, having a lower potential than the bandgap reference voltage. A second voltage divider 206 has an input on line 114 to accept the first supply voltage and an output on line 106 to supply the second reference voltage, having a lower potential than the first supply voltage.

In another aspect, the comparator power supply input is connected to the second supply voltage 116. The comparator 102 supplies a "high" switch signal about equal to the second supply voltage when the first reference voltage is less than the second reference voltage, and supplies a "low" switch signal about equal to (second supply voltage/2) when the second reference voltage is greater than the first reference voltage. The switch 112 selects the first supply voltage on line 114 when the switch signal is "high", and selects the second supply voltage on line 116 when the switch signal is "low".

A second current path 208 has an input on line 116 to accept the second supply voltage, an input on line 110 to accept the switch signal, and an output to supply the third supply voltage on line 118. The third supply voltage supplied by the second current path 208 is less than or equal to the second supply voltage, and it is supplied when the switch signal is "low". A first current path 210 has an input on line 114 to accept the first supply voltage and an output to supply the third supply voltage on line 118. The third supply voltage supplied by the first current path 210 is less than the first supply voltage, and it is supplied when the switch signal is "high".

In one aspect, the first supply voltage on line 114 varies within a first range of voltages. The second supply voltage on line 116 varies within a second range of voltages, with a high limit inside the first range of voltages and a low limit outside the first range of voltages. The third supply voltage on line 118 varies within a third range of voltages, with a high limit outside the first range of voltages, but inside the second range of voltages, and a low limit outside the second range of voltages. For example, the first range of voltages may be about 3 to 3.6 volts, the second range of voltages about 1.3 to 3.3 volts, and the third range about voltages 1.8 volts, or less.

Figure 3:
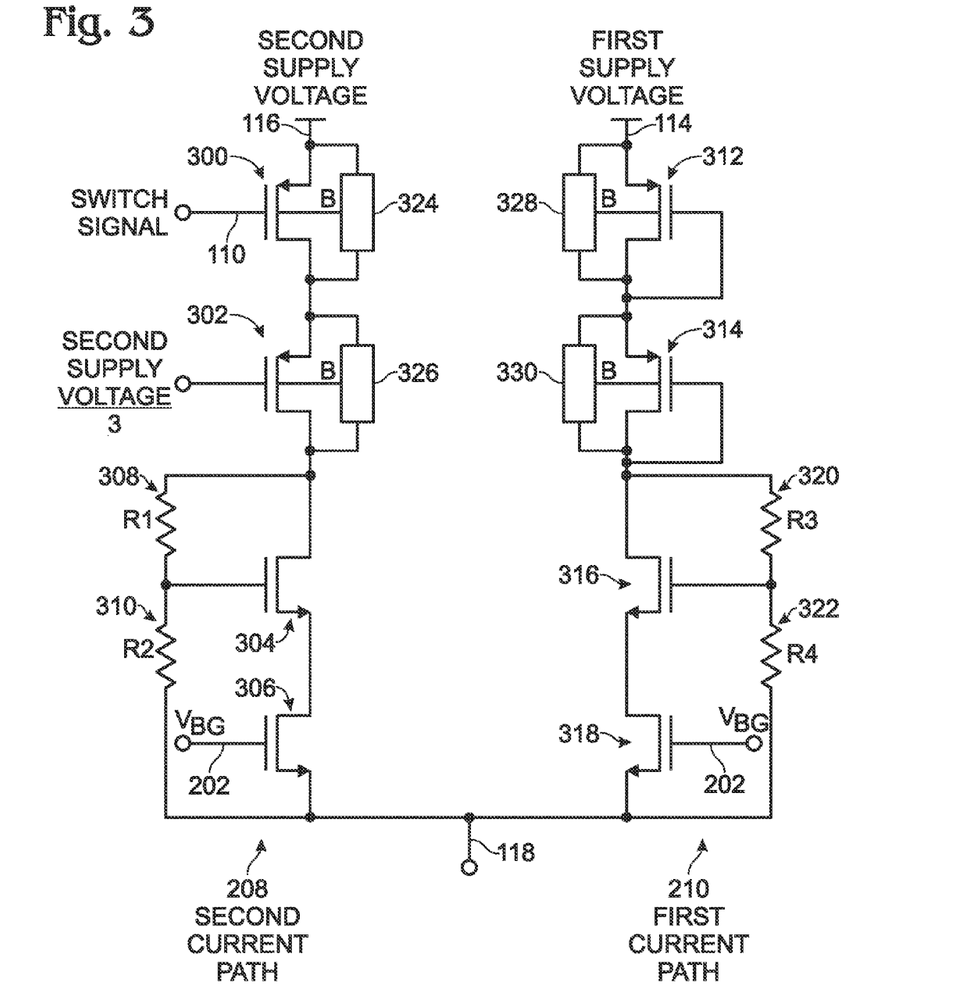
FIG. 3 is a schematic depicting in detail an exemplary enablement of the switch of FIGS. 1 and 2.

FIG. 3 is a schematic depicting in detail an exemplary enablement of the switch of FIGS. 1 and 2. The second current path 208 includes a first field effect transistor (FET) 300 having a source connected to the second supply voltage on line 116, a gate connected to the switch signal on line 110, and a drain. Note: the FET source is denoted by the "arrow" symbol. A second FET 302 has a source connected to the drain of the first FET 300, a gate biased to (second supply voltage/3), and a drain. A third FET 304 has a drain connected to the drain of the second FET 302, a gate, and a source. A fourth FET 306 has a drain connected to the source of the third FET 304, a gate biased to the bandgap reference voltage on line 202, and a source connected to the switch output on line 118. A first resistor 308 (R1) is interposed between the drain of the third FET 304 and the gate of the third FET 304. A second resistor 310 (R2) is interposed between the gate of the third FET 304 and the source of the fourth FET 306.

The first current path 210 includes a fifth FET 312 with a source connected to the first supply voltage on line 114, a gate, and a drain connected to the gate of the fifth FET 312. A sixth FET 314 has a source connected to the drain of the fifth FET 312, a gate, and a drain connected to the gate of the sixth FET 314. A seventh FET 316 has a drain connected to the drain of the sixth FET 314, a gate, and a source. An eighth FET 318 has a drain connected to the source of the seventh FET 316, a gate biased to the bandgap reference voltage on line 202, and a source connected to the switch output on line 118. A third resistor 320 (R3) is interposed between the drain of the sixth FET 314 and the gate of the seventh FET 316. A fourth resistor 322 (R4) is interposed between the gate of the seventh FET 316 and the source of the eighth FET 318.

In one aspect, the third FET 304, fourth FET 306, seventh FET 316, and eighth FET 318 are native devices having a gate-to-source threshold voltage of about 0.05 volts. In another aspect, the first FET 300, second FET 302, fifth FET 312, and sixth FET 314 are metal-oxide-semiconductor FETs (MOSFETs) devices having a gate-to-source threshold voltage of about 0.5 volts.

Optionally as shown, the first FET 300, second FET 302, fifth FET 312, and sixth FET 314 each have a bulk interface (marked as "B"). Then, the second current path 208 further includes a first high voltage selector 324 with a first input connected to the source of the first FET 300, a second input connected to the drain of the first FET 300, and an output connected to the bulk interface of the first FET 300. The first high voltage selector 324 supplies the higher of either the voltage at the source of the first FET or the voltage at the drain of the first FET 300. A second high voltage selector 326 has a first input connected to the source of the second FET 302, a second input connected to the drain of the second FET 302, and an output connected to the bulk interface of the second FET 302. The second high voltage selector 326 supplies the higher of either the voltage at the source of the second FET or the voltage at the drain of the second FET.

The first current path 210 includes a third high voltage selector 328 with a first input connected to the source of the third FET 312, a second input connected to the drain of the third FET 312, and an output connected to the bulk interface of the third FET 312. The third high voltage selector supplies the higher of either the voltage at the source of the third FET or voltage at the drain of the third FET 312. A fourth high voltage selector 330 has a first input connected to the source of the fourth FET 314, a second input connected to the drain of the fourth FET 314, and an output connected to the bulk interface of the fourth FET 314. The fourth high voltage selector supplies the higher of either voltage at the source of the fourth FET or the voltage at the drain of the fourth FET.

Figure 4:
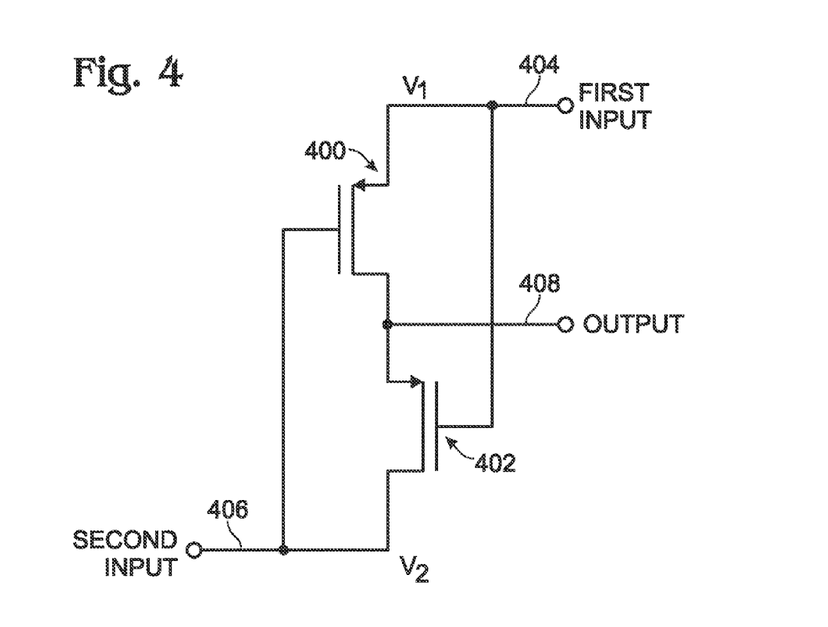
FIG. 4 is a schematic diagram depicting an exemplary high voltage selector.

FIG. 4 is a schematic diagram depicting an exemplary high voltage selector. Each high voltage selector includes a top MOSFET 400 having a source connected to the first input 404, a gate connected to the second input on line 406, and a drain connected to the output 408. A bottom MOSFET 402 has a drain connected to the second input 406, a gate connected to the first input 404, and a source connected to the output 408. For example, the high voltage selector may be the first high voltage selector of FIG. 3, with V1 being the first FET source voltage and V2 being the first FET drain voltage.

Figure 5:
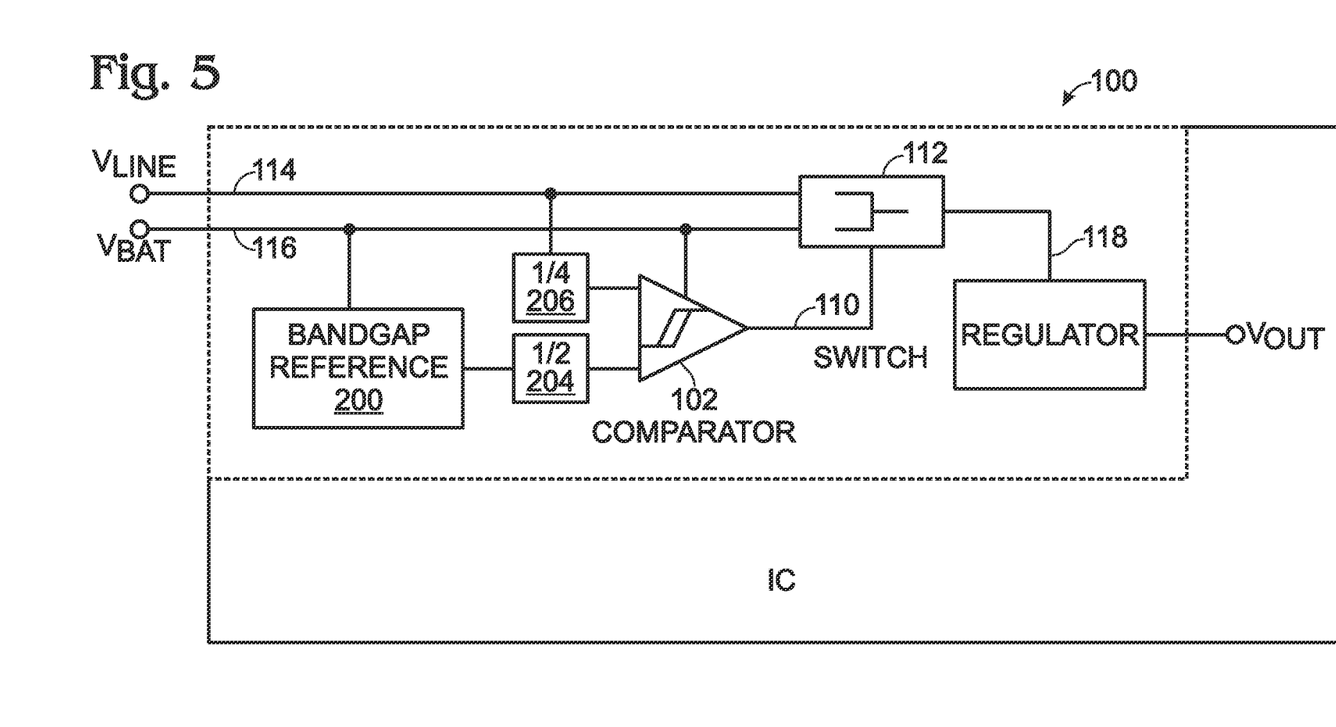
FIG. 5 is a schematic diagram depicting the power source selection circuit as part of a monolithic device.

FIG. 5 is a schematic diagram depicting the power source selection circuit as part of a monolithic device. In this aspect, a line interface ($V_{line}$) accepts a selectively connected first supply voltage on line 114. A battery interface ($V_{bat}$) accepts the second supply voltage on line 116. A voltage regulator 500 has an input connected to receive the third supply voltage from the switch on line 118. The regulator output supplies current to other devices (not shown) in the monolithic device (IC). The comparator 102 supplies a "low" switch signal when the line interface (line 114) fails to supply the first supply voltage. Note: in this aspect, the first voltage divider 204 divides the bandgap reference voltage by 2, and the second voltage divider divides the first supply voltage by 4.

Figure 6A:
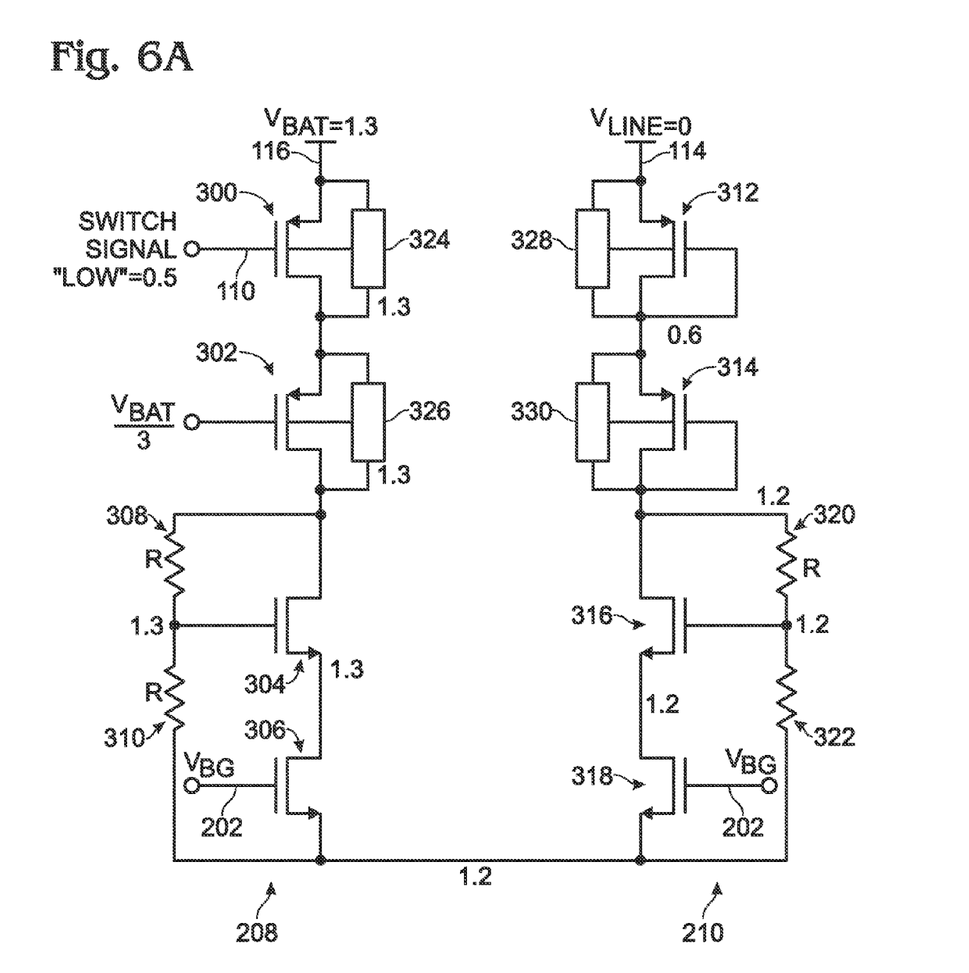
FIGS. 6A, 6B, and 6C are schematic drawings of the switch of FIG. 3 depicting individual node voltages.
Figure 6B:
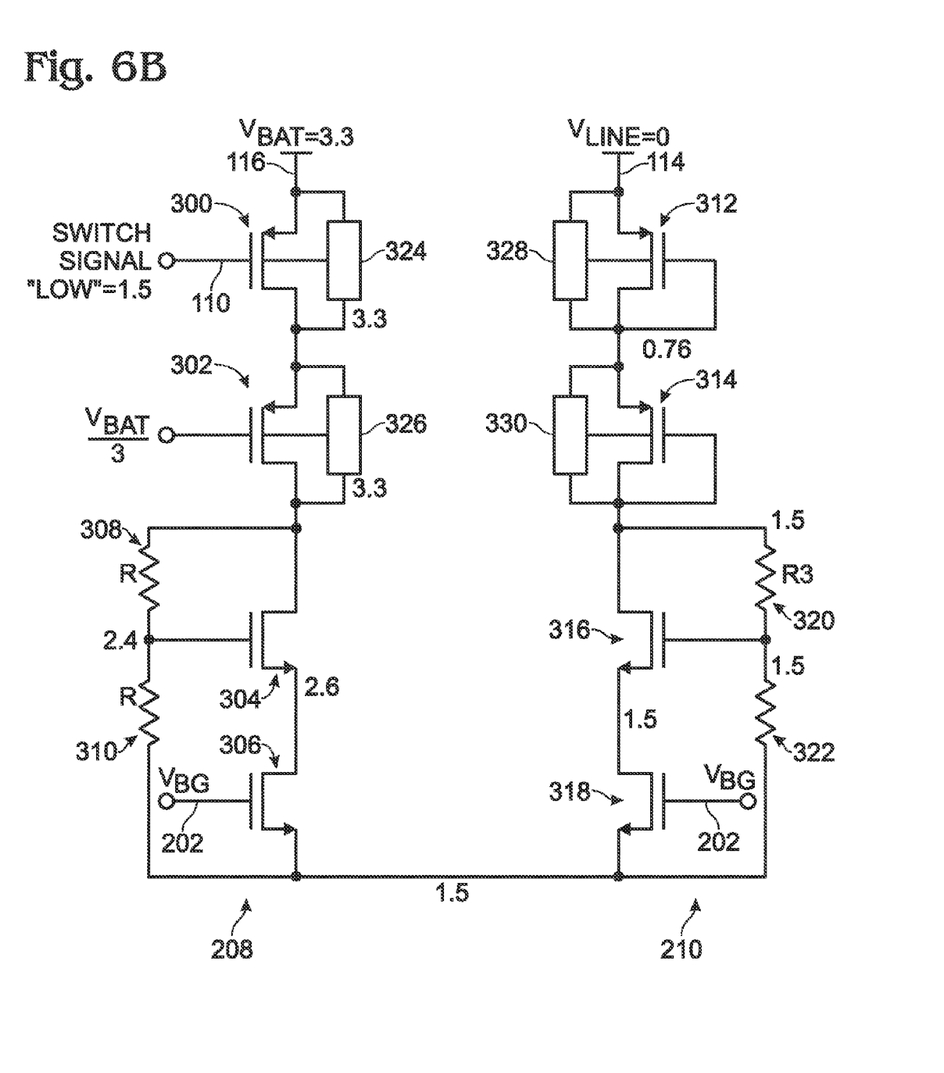
Figure 6C:
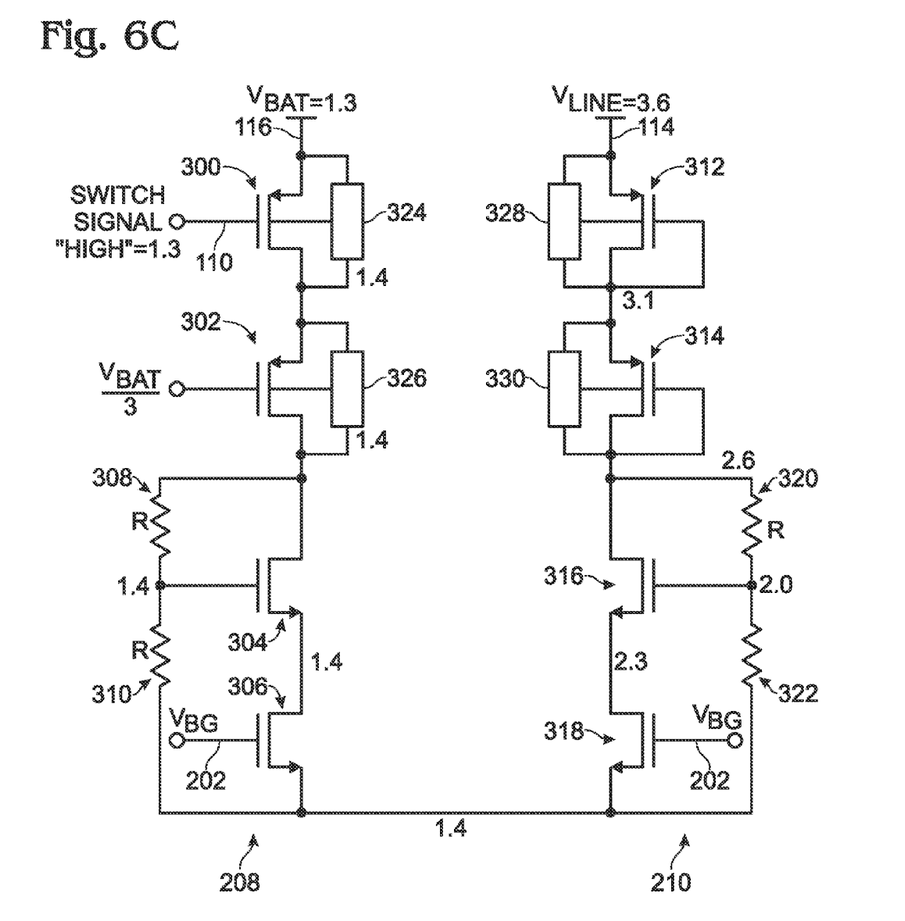

FIGS. 6A, 6B, and 6C are schematic drawings of the switch of FIG. 3 depicting individual node voltages. In FIG. 6A the second supply voltage (battery) is 1.3 volts and the first supply voltage (line) is 0 volts. The switch signal is "low", supplying a voltage of about 0.5 volts, and the second supply voltage (battery) is selected. In FIG. 6B the second supply voltage (battery) is 3.3 volts and the first supply voltage (line) is 0 volts. The switch signal is "low", supplying a voltage of about 1.5 volts, and the second supply voltage (battery) is selected. In FIG. 6C the second supply voltage (battery) is 1.3 volts and the first supply voltage (line) is 3.6 volts. The switch signal is "high", supplying a voltage of about 1.3 volts, and the first supply voltage (line) is selected.

Figure 7:
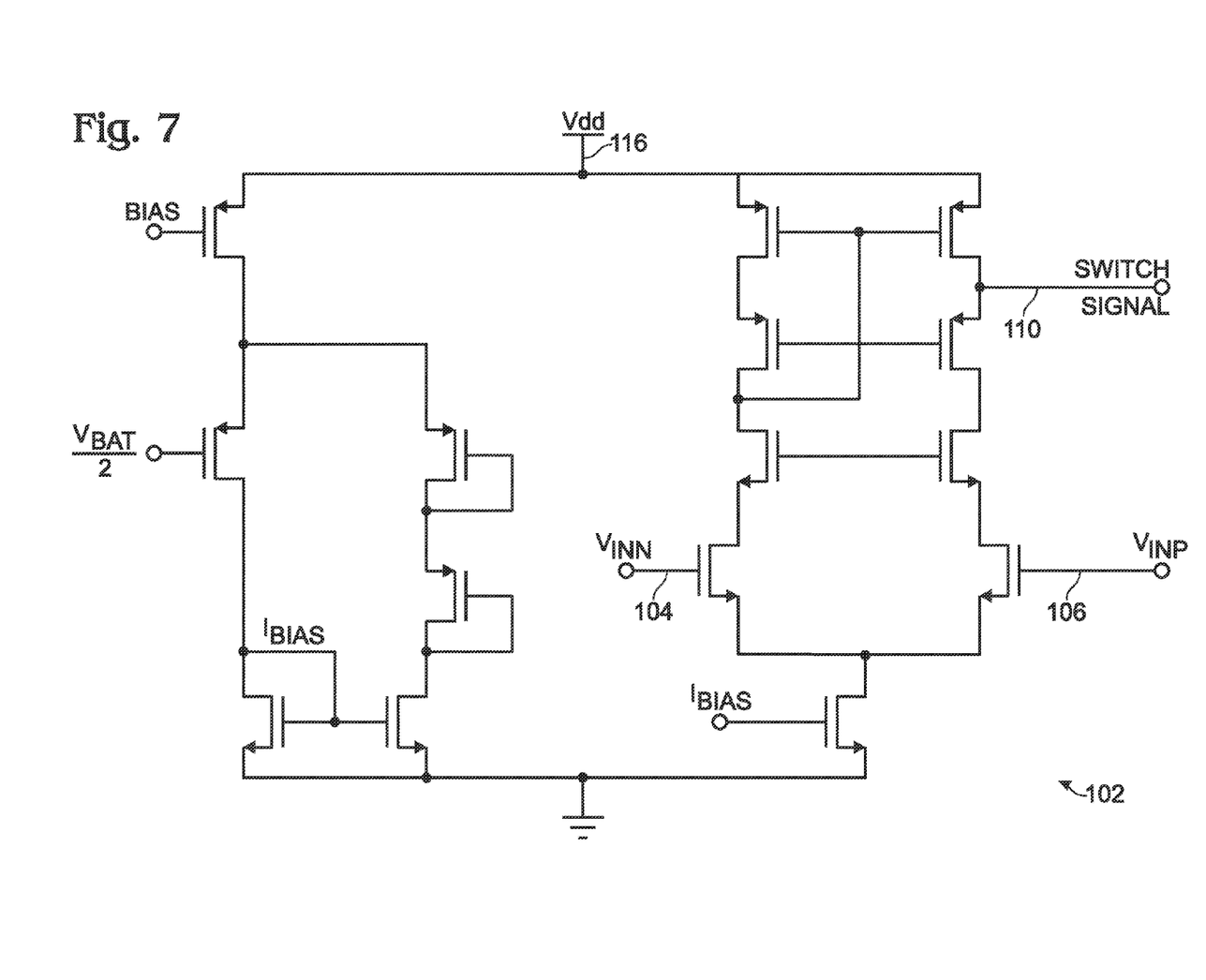
FIG. 7 is a schematic diagram depicting the comparator of FIGS. 1, 2, and 5 in detail.

FIG. 7 is a schematic diagram depicting the comparator of FIGS. 1, 2, and 5 in detail. If the devices supplied by the power source selection circuit and regulator are designed to withstand a maximum voltage stress of about 1.8 V, then the gate-to-source stress on the first FET of FIG. 3 should not be more than half of $V_{BAT}$.

The two power supplies available to an integrated circuit (IC) are typically line and battery. The lifetime of a battery depends on the power drawn from it. Thus, in order to increase the lifetime of a battery it is advantageous to use the line supply whenever it is available. The circuits explained above describe a monolithic on-chip system that detects the availability of line supply and selects it as the source of power for the linear regulator, which in turn generates a constant output voltage Vout, used to power the IC, see FIG. 5.

Owing to fundamental operating principles, a MOSFET can withstand a limited voltage difference across its terminals. Based on this limit, they are classified in different categories such as 1.8V device, 0.9V device, etc. In the above examples, in spite of the fact that the output voltage of the battery varies between 1.3 and 3.3 V, the above-described power source selection circuit presents a way to implement supply selection scheme employing an output voltage no greater than 1.8 V.

The availability of the line supply, typically 3.3 V in the above examples, is detected by comparing a fraction of that voltage with a fixed voltage generated on-chip using a bandgap reference voltage. The comparison generates the switch signal.

In order to avoid current leakage in the "off" condition of the switch, bulk leakage can be eliminated by tying the bulk of the switching MOSFETs to the higher of drain or source potentials. This can be accomplished by employing the high voltage selector circuit described schematically in FIG. 4. However, other high voltage selector designs may also be used to enable the switch.

A power supply source selection circuit has been provided. Examples of particular circuit designs and voltage levels have been presented to illustrate the invention. However, the invention is not limited to merely these examples. Other variations and embodiments of the invention will occur to those skilled in the art.

We claim:

1. A power supply source selection circuit comprising:
   a comparator comprising an input to accept a first reference voltage directly proportional to a bandgap reference voltage, an input to accept a second reference voltage directly proportional to a first supply voltage, and an output to supply a switch signal in response to comparing the second reference voltage to the first reference voltage; and,
   a switch comprising an input to accept the first supply voltage, an input to accept a second supply voltage, an input to accept the switch signal, and an output to supply a third supply voltage to a regulator, the third voltage comprising a voltage potential less than or equal to a maximum voltage value, the switch selecting between the first supply voltage and the second supply voltage in response to the switch signal, the switch comprising a first current path and a second current path comprising at least a first field effect transistor (FET) and a second FET, the first FET comprising a source connected to the second supply voltage and a gate connected to the switch signal, and the second FET comprising a source connected to the first FET and a gate biased to a portion of the second supply voltage,
   wherein the second current path further comprises:
   a third FET comprising a drain connected to a drain of the second FET, a gate, and a source;
   a fourth FET comprising a drain connected to the source of the third FET, a gate biased to the bandgap reference voltage, and a source connected to the switch output.

2. The power supply source selection circuit of claim 1 further comprising:
   a bandgap voltage reference circuit comprising an input to accept the second supply voltage and an output to supply the bandgap reference voltage comprising a constant voltage potential;
   a first voltage divider comprising an input to accept the bandgap reference voltage and an output to supply the first reference voltage, comprising a lower potential than the bandgap reference voltage; and,
   a second voltage divider comprising an input to accept the first supply voltage and an output to supply the second reference voltage, comprising a lower potential than the first supply voltage.

3. The power supply source selection circuit of claim 1 wherein the comparator further comprises a power supply input connected to the second supply voltage, and the comparator supplies a "high" switch signal about equal to the second supply voltage when the first reference voltage is less than the second reference voltage, and supplies a "low" switch signal about equal to (second supply voltage/2) when the second reference voltage is greater than the first reference voltage; and,
   the switch selects the first supply voltage when the switch signal is "high", and selects the second supply voltage when the switch signal is "low".

4. The power supply source selection circuit of claim 3 wherein the
   first current path comprises an input to accept the first supply voltage and an output to supply the third supply voltage, less than the first supply voltage, in response to the switch signal being "high", and
   the second current path comprises an input to accept the second supply voltage, an input to accept the switch signal, and an output to supply the third supply voltage, less than or equal to the second supply voltage, in response to the switch signal being "low".

5. The power supply source selection circuit of claim 4 wherein the first supply voltage varies within a first range of voltages;
   the second supply voltage varies within a second range of voltages that comprises a high limit inside the first range of voltages and a low limit outside the first range of voltages; and,
   the third supply voltage varies within a third range of voltages that comprises a high limit outside the first range of voltages, but inside the second range of voltages, and a low limit outside the second range of voltages.

6. The power supply source selection circuit of claim 5 wherein the first range of voltages is about 3 to 3.6 volts;
   wherein the second range of voltages is about 1.3 to 3.3 volts; and,
   wherein the third range of voltages is about 1.8 volts, or less.

7. The power supply source selection circuit of claim 1 wherein the second current path further comprises:
   a first resistor interposed between the drain of the third FET and the gate of the third FET;
   a second resistor interposed between the gate of the third FET and the source of the fourth FET;
   wherein the first current path comprises:
   a fifth FET comprising a source connected to the first supply voltage, a gate, and a drain connected to the gate of the fifth FET;
   a sixth FET comprising a source connected to the drain of the fifth FET, a gate, and a drain connected to the gate of the sixth FET;
   a seventh FET comprising a drain connected to the drain of the sixth FET, a gate, and a source;
   an eighth FET comprising a drain connected to the source of the seventh FET, a gate biased to the bandgap reference voltage, and a source connected to the switch output;
   a third resistor interposed between the drain of the sixth FET and the gate of the seventh FET; and,
   a fourth resistor interposed between the gate of the seventh FET and the source of the eighth FET.

8. The power supply source selection circuit of claim 7 wherein the third, fourth, seventh, and eighth FETs are native devices comprising a gate-to-source threshold voltage of about 0.05 volts.

9. The power supply source selection circuit of claim 8 wherein the first, second, fifth, and sixth FETs are metal-oxide-semiconductor FETs (MOSFETs) devices comprising a gate-to-source threshold voltage of about 0.5 volts.

10. The power supply source selection circuit of claim 8 wherein the first, second, fifth, and sixth FETs each comprise a bulk interface;
the second current path further comprises:
a first high voltage selector comprising a first input connected to the source of the first FET, a second input connected to a drain of the first FET, and an output connected to the bulk interface of the first FET supplying a higher of the voltages selected from a group consisting of a voltage at the source of the first FET and a voltage at the drain of the first FET;
a second high voltage selector comprising a first input connected to the source of the second FET, a second input connected to the drain of the second FET, and an output connected to the bulk interface of the second FET supplying a higher of the voltages selected from a group consisting of a voltage at the source of the second FET and a voltage at the drain of the second FET;
the first current path further comprises:
a third high voltage selector comprising a first input connected to the source of the third FET, a second input connected to the drain of the third FET, and an output connected to the bulk interface of the third FET supplying a higher of the voltages selected from a group consisting of a voltage at the source of the third FET and a voltage at the drain of the third FET; and,
a fourth high voltage selector comprising a first input connected to the source of the fourth FET, a second input connected to the drain of the fourth FET, and an output connected to the bulk interface of the fourth FET supplying a higher of the voltages selected from a group consisting of a voltage at the source of the fourth FET and a voltage at the drain of the fourth FET.

11. The power supply source selection circuit of claim 10 wherein each high voltage selector comprises:
a top MOSFET comprising a source connected to the first input, a gate connected to the second input, and a drain connected to the output; and,
a bottom MOSFET comprising a drain connected to the second input, a gate connected to the first input, and a source connected to the output.

12. The power supply source selection circuit of claim 4 wherein the circuit is a monolithic device further comprising:
a line interface to accept a selectively connected first supply voltage;
a battery interface to accept the second supply voltage;
a voltage regulator comprising an input connected to receive the third supply voltage from the switch; and,
wherein the comparator supplies a "low" switch signal when the line interface fails to supply the first supply voltage.

13. A system comprising:
a comparator comprising an input to accept a first reference voltage directly proportional to a bandgap reference voltage, an input to accept a second reference voltage directly proportional to a first supply voltage, and an output to supply a switch signal in response to comparing the second reference voltage to the first reference voltage; and,
a switch comprising an input to accept the first supply voltage, an input to accept a second supply voltage, an input to accept the switch signal, and an output to supply a third supply voltage to a regulator, the third voltage comprising a voltage potential less than or equal to a maximum voltage value, the switch selecting between the first supply voltage and the second supply voltage in response to the switch signal, the switch comprising a first current path and a second current path comprising at least a first field effect transistor (FET) and a second FET, the first FET comprising a source connected to the second supply voltage and a gate connected to the switch signal, and the second FET comprising a source connected to the first FET and a gate biased to a portion of the second supply voltage,
wherein the second current path further comprises:
a third FET comprising a drain connected to a drain of the second FET, a gate, and a source;
a fourth FET comprising a drain connected to the source of the third FET, a gate biased to the bandgap reference voltage, and a source connected to the switch output.

14. The system of claim 13 further comprising:
a bandgap voltage reference circuit comprising an input to accept the second supply voltage and an output to supply the bandgap reference voltage comprising a constant voltage potential;
a first voltage divider comprising an input to accept the bandgap reference voltage and an output to supply the first reference voltage, comprising a lower potential than the bandgap reference voltage; and,
a second voltage divider comprising an input to accept the first supply voltage and an output to supply the second reference voltage, comprising a lower potential than the first supply voltage.

15. The system of claim 13 wherein the second current path further comprises:
a first resistor interposed between the drain of the third FET and the gate of the third FET;
a second resistor interposed between the gate of the third FET and the source of the fourth FET;
wherein the first current path comprises:
a fifth FET comprising a source connected to the first supply voltage, a gate, and a drain connected to the gate of the fifth FET;
a sixth FET comprising a source connected to the drain of the fifth FET, a gate, and a drain connected to the gate of the sixth FET;
a seventh FET comprising a drain connected to the drain of the sixth FET, a gate, and a source;
an eighth FET comprising a drain connected to the source of the seventh FET, a gate biased to the bandgap reference voltage, and a source connected to the switch output;
a third resistor interposed between the drain of the sixth FET and the gate of the seventh FET; and,
a fourth resistor interposed between the gate of the seventh FET and the source of the eighth FET.

16. The system of claim 15 wherein the third, fourth, seventh, and eighth FETs are native devices comprising a gate-to-source threshold voltage of about 0.05 volts.

17. The system of claim 16 wherein the first, second, fifth, and sixth FETs are metal-oxide-semiconductor FETs (MOSFETs) devices comprising a gate-to-source threshold voltage of about 0.5 volts.

18. The system of claim 16 wherein the first, second, fifth, and sixth FETs each comprise a bulk interface;
wherein the second current path further comprises:
a first high voltage selector comprising a first input connected to the source of the first FET, a second input connected to a drain of the first FET, and an output connected to the bulk interface of the first FET supplying a higher of the voltages selected from a group consisting of a voltage at the source of the first FET and a voltage at the drain of the first FET;

a second high voltage selector comprising a first input connected to the source of the second FET, a second input connected to the drain of the second FET, and an output connected to the bulk interface of the second FET supplying a higher of the voltages selected from a group consisting of a voltage at the source of the second FET and a voltage at the drain of the second FET;

wherein the first current path further comprises:

a third high voltage selector comprising a first input connected to the source of the third FET, a second input connected to the drain of the third FET, and an output connected to the bulk interface of the third FET supplying a higher of the voltages selected from a group consisting of a voltage at the source of the third FET and a voltage at the drain of the third FET; and, a fourth high voltage selector comprising a first input connected to the source of the fourth FET, a second input connected to the drain of the fourth FET, and an output connected to the bulk interface of the fourth FET supplying a higher of the voltages selected from a group consisting of a voltage at the source of the fourth FET and a voltage at the drain of the fourth FET.

19. The system of claim 18 wherein each high voltage selector comprises:

a top MOSFET comprising a source connected to the first input, a gate connected to the second input, and a drain connected to the output; and, a bottom MOSFET comprising a drain connected to the second input, a gate connected to the first input, and a source connected to the output.

20. A system comprising:

a comparator configured to accept a bandgap reference voltage, accept a first supply voltage, and supply a switch signal in response to comparing the first supply voltage to the bandgap reference voltage; and, a switch configured to accept the first supply voltage, accept a second supply voltage, accept the switch signal, and supply a third supply voltage to a regulator, the third voltage comprising a voltage potential less than or equal to a maximum voltage value, the switch selecting between the first supply voltage and the second supply voltage in response to the switch signal, the switch comprising a first current path and a second current path comprising at least a first field effect transistor (FET) and a second FET, the first FET comprising a source connected to the second supply voltage and a gate connected to the switch signal, and the second FET comprising a source connected to the first FET and a gate biased to a portion of the second supply voltage, wherein the second current path further comprises:

a third FET comprising a drain connected to a drain of the second FET, a gate, and a source;

a fourth FET comprising a drain connected to the source of the third FET, a gate biased to the bandgap reference voltage, and a source connected to the switch output.

* * * * *